(12) United States Patent
Bonansea et al.

(10) Patent No.: US 7,289,772 B1
(45) Date of Patent: *Oct. 30, 2007

(54) TECHNIQUE ALLOWING A STATUS BAR USER RESPONSE ON A PORTABLE DEVICE GRAPHIC USER INTERFACE

(75) Inventors: Michel Bonansea, Montpellier (FR); Vincent Leclaire, Castelnau le lez (FR)

(73) Assignee: PalmSource, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/984,114

(22) Filed: Nov. 8, 2004

(51) Int. Cl.
*H04B 1/38* (2006.01)
*H04M 1/00* (2006.01)
(52) U.S. Cl. .................. 455/73; 455/566; 455/567
(58) Field of Classification Search ............. 455/412.1, 455/412.2, 413, 414.1, 415–417, 466, 556.2, 455/566–567, 556.1
See application file for complete search history.

(56) References Cited

U.S. PATENT DOCUMENTS

| | | | |
|---|---|---|---|
| 5,559,860 A | * | 9/1996 | Mizikovsky ................. 455/413 |
| 5,758,280 A | * | 5/1998 | Kimura ..................... 455/412.2 |
| 6,282,435 B1 | * | 8/2001 | Wagner et al. ............... 455/566 |
| 6,285,364 B1 | * | 9/2001 | Giordano et al. ........... 715/804 |
| 6,389,277 B1 | * | 5/2002 | Salzwedel ................. 455/414.1 |
| 6,456,841 B1 | * | 9/2002 | Tomimori ................. 455/412.2 |
| 6,574,471 B1 | * | 6/2003 | Rydbeck ..................... 455/418 |
| 6,985,924 B2 | * | 1/2006 | Schwartz et al. ........... 709/206 |
| 6,993,362 B1 | * | 1/2006 | Aberg ......................... 455/566 |
| 2004/0214553 A1 | * | 10/2004 | Kang et al. ................. 455/413 |

* cited by examiner

*Primary Examiner*—Simon Nguyen
(74) *Attorney, Agent, or Firm*—Berry & Associates P.C.

(57) ABSTRACT

The present invention relates to a method for utilizing a graphic user interface in a portable electronic device. Specifically, the present invention pertains to a method of using a portion of a graphic user interface display to provide information to the user without disrupting an application in progress. The user interface provides tools that enable the user to answer or reject an incoming call, without interruption of applications already operating on the device during the call. On a portable electronic device that combines computer functions and wireless telephone functions, the user is able to view caller ID information, in an information window, while using another application. Further, the user is able to make a decision about answering or rejecting the call and execute the appropriate response, all without having to interrupt the application currently in use. It is appreciated that the portable electronic device could be a cellular phone, a personal data assistant, a pager, etc.

16 Claims, 11 Drawing Sheets

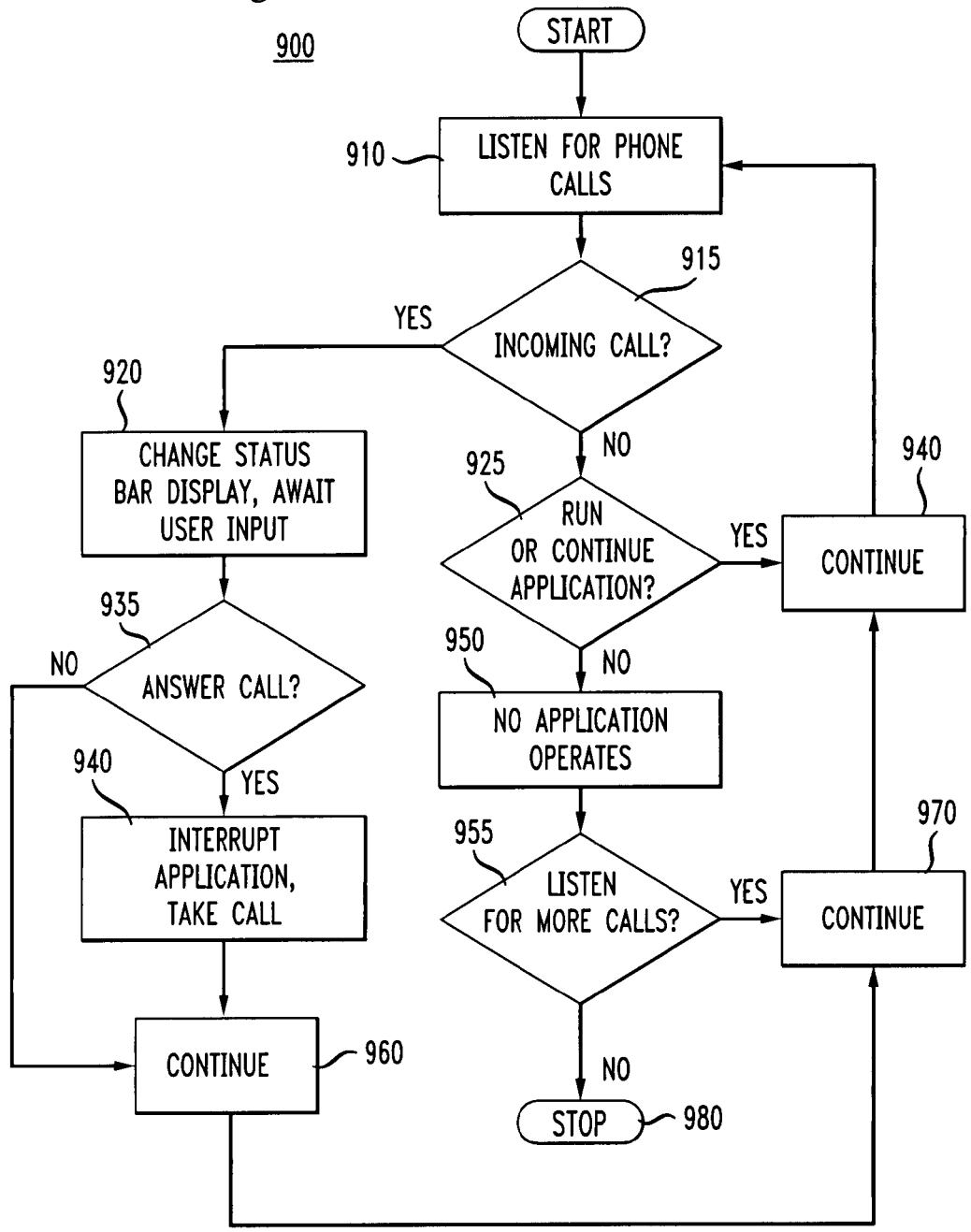

TECHNIQUE ALLOWING A STATUS BAR USER RESPONSE ON A PORTABLE DEVICE GRAPHIC USER INTERFACE

RELATED APPLICATIONS

This application is related to and claims priority to U.S. patent Ser. No. 09/764,653 entitled "Technique Allowing A Status Bar User Response On A Portable Device Graphic User Interface," by Bonansea et al., filed on Jan. 16, 2001, which is incorporated herein by reference.

FIELD OF THE INVENTION

The present invention relates to a method for using a status bar display to provide a user interface on a portable electronic device.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Further development of PDAs has enabled their use for more and more tasks. For example, portable, and even wireless, access to computer networks is now readily available with suitably configured devices. The portability and convenience of palmtop devices has enabled the even more exciting possibilities encompassed by the combination of the capabilities of palmtop devices with the communication convenience of wireless phones, e.g. cellular phones.

As the capabilities of the two device types combine, and even combine into the same unit, new demands are made of the small display area available on these characteristically small devices. The display area of these portable devices is necessarily limited by the size of the devices themselves, which is their primary advantage. As the breadth of applications of portable devices increases, the display "real estate" of the devices becomes more and more used up. Each new application requires some new user interface. In particular, the use of a palmtop computing device that is also a cellular phone has been limited by interruptions of computing functions by incoming calls or by the need to leave the device in standby mode in order to receive calls.

What is required, therefore, is a means by which the palmtop device and/or wireless telephone can continue to be operated as a computing device yet still allow a user to receive and/or reject calls. The need further exists to allow call screening during continued computational use, without interruption of any applications in operation, by the sharing of the graphic display area.

SUMMARY OF THE INVENTION

An embodiment of the present invention is a wireless telephone device which can continue to be operated as a palmtop computing device yet still allow a user to receive and/or reject calls. This device embodiment provides a method that allows call screening during continued computational use, without interruption of any applications in operation, by the sharing of the display area. An embodiment of the present invention can also be implemented on a palmtop device that has wireless telephone functionality.

The present invention relates to a method for utilizing a graphic user interface in a portable electronic device. Specifically, the present invention pertains to a method of using a portion of a graphic user interface display to provide information to the user without disrupting an application in progress. The user interface provides tools that enable the user to answer or reject an incoming call, without interruption of applications already operating on the device during the call. On a portable electronic device that combines computer functions and wireless telephone functions, the user is able to view caller ID information, in an information window, while using another application. Further, the user is able to make a decision about answering or rejecting the call and execute the appropriate response, all without having to interrupt the application currently in use.

The embodiment of the present invention herein presents a portable electronic device, which comprises at least a graphic display screen and a wireless telephone circuit. In the portable electronic device, the graphic display screen is capable of displaying an information window which is being responsive to an incoming call on the wireless telephone circuit and the user is able to select a response to the incoming call, without disrupting any application that was operating when the call was received by the device.

BRIEF DESCRIPTION OF THE DRAWINGS

The operation of this invention can be best visualized by reference to the drawings.

FIG. 9 illustrates a flow chart showing one possible operation sequence in accordance with one embodiment of the present invention.

DETAILED DESCRIPTION

Figure 1:
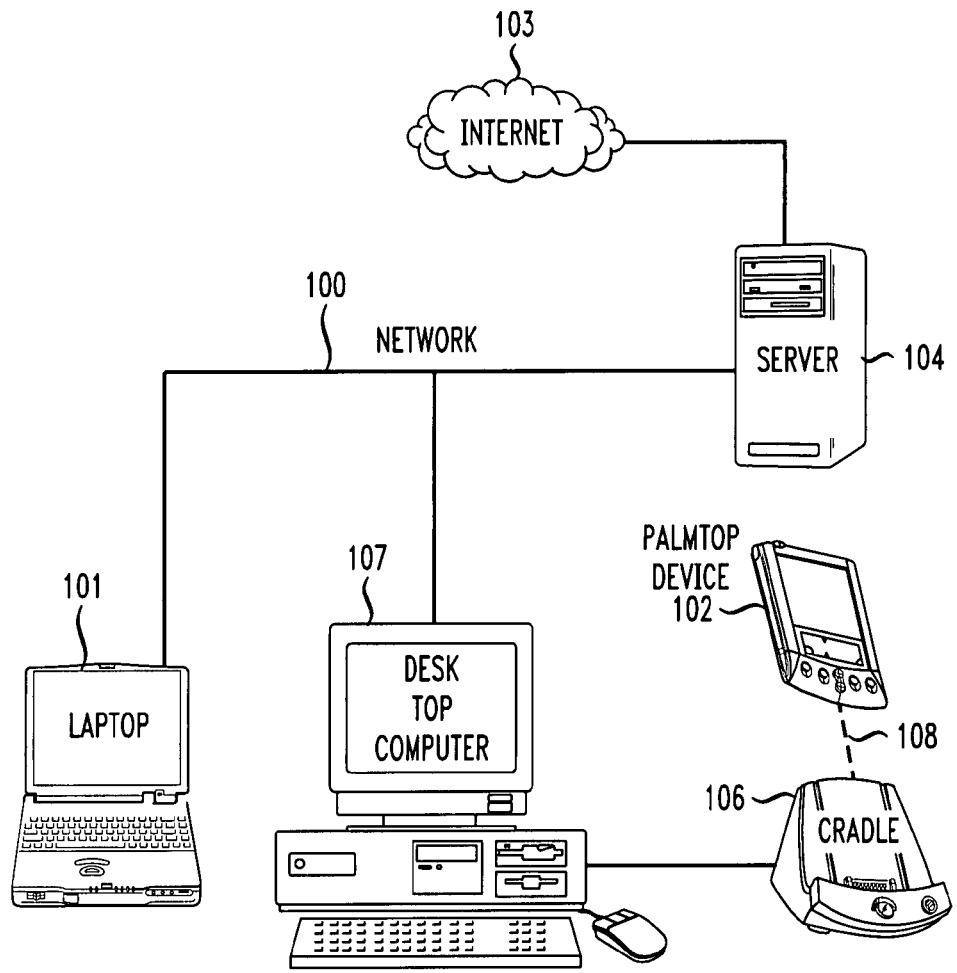
FIG. 1 illustrates a typical palmtop device system environment.

Reference will now be made in detail to embodiments of the present invention, examples of which are illustrated in the accompanying drawings. While the invention will be described in conjunction with these specific embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory (e.g. process 1100 of FIG. 11). These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or similar terms, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Portable Electronic Device Platform

The embodiment of the present invention discussed herein relates to a method of utilizing a portion of the graphic user interface (GUI) in a portable electronic device which is enabled as a wireless telephone. The portable electronic device could be a PDA having wireless telephone functionality or it could be a wireless telephone having PDA functionality. The basic difference between these is related to form factor selected, display size and physical user interface. Also contemplated are pagers and other portable remote control devices.

The portion of the GUI referred to would be, in this embodiment, used to inform the user of the existence of an incoming call and allow the user to take an action with respect to that call. Other embodiments could provide similar responses to events that are not telephone calls. Calls are selected as this embodiment's examples because of their particular applicability to the advantages provided by the present invention. The portion of the GUI envisioned for this function, in this embodiment, is the "status bar" of the GUI, though any other portion of the display of a GUI could be utilized to the same end.

In this discussion of some embodiments of the present invention, the terms "palmtop", "palm device", "PDA", "handheld device", and "portable computing device" are used more or less interchangeably, as noted above. In each case, they refer to a class of small, user-portable, computing devices that are capable of performing the functions of portable computing devices. Some of the above terms are also used to refer to devices that combine the functions of portable computing devices with those of wireless telephones.

In this discussion, the terms "wireless telephone", "wireless telephone device", "cellular telephone", "wireless phone" and "portable telephone device" are also used more or less interchangeably. In each case, they refer to a class of small, user-portable, communication devices that are capable of voice and/or data communication with other cellular telephones, hardwired telephones or networks by wireless links. In some implementations of wireless telephones in which a GUI has been implemented, user input can be entered by the use of a stylus or other pen-like pointing device. These devices can be referred to as a "pen-based" telephones.

The operation of this embodiment of the present invention and the environment in which its operates can be understood by reference to the figures. FIG. 1 presents, in logical form, a typical network in accordance with one embodiment of the present invention as implemented on a PDA. Both desktop computer 107 and laptop 101 and connected to network 100 which also served by server 104. Server 104 also, in this implementation, provides connectivity to internet 103. Connected to desktop 107 is palmtop device cradle 106 which provides a means of connecting, 108, palmtop device 102. By supplying this connection, desktop 107 takes on the role of host device to palmtop device 102. Although the connectivity of palmtop device 102 is shown in this embodiment to be by hardwired cradle (see FIG. 4), other embodiments may employ infrared, RF or any other means of connectivity between the host device and the portable device. By whatever means connected, the object of synchronization is to share data between copies of a database between a PDA and a host computer. An important part of this synchronization, applicable to this embodiment of the present invention, is the ability to quickly and conveniently load applications and data, such as telephone number databases, onto a portable telephone device that is synchronization enabled.

Figure 2:
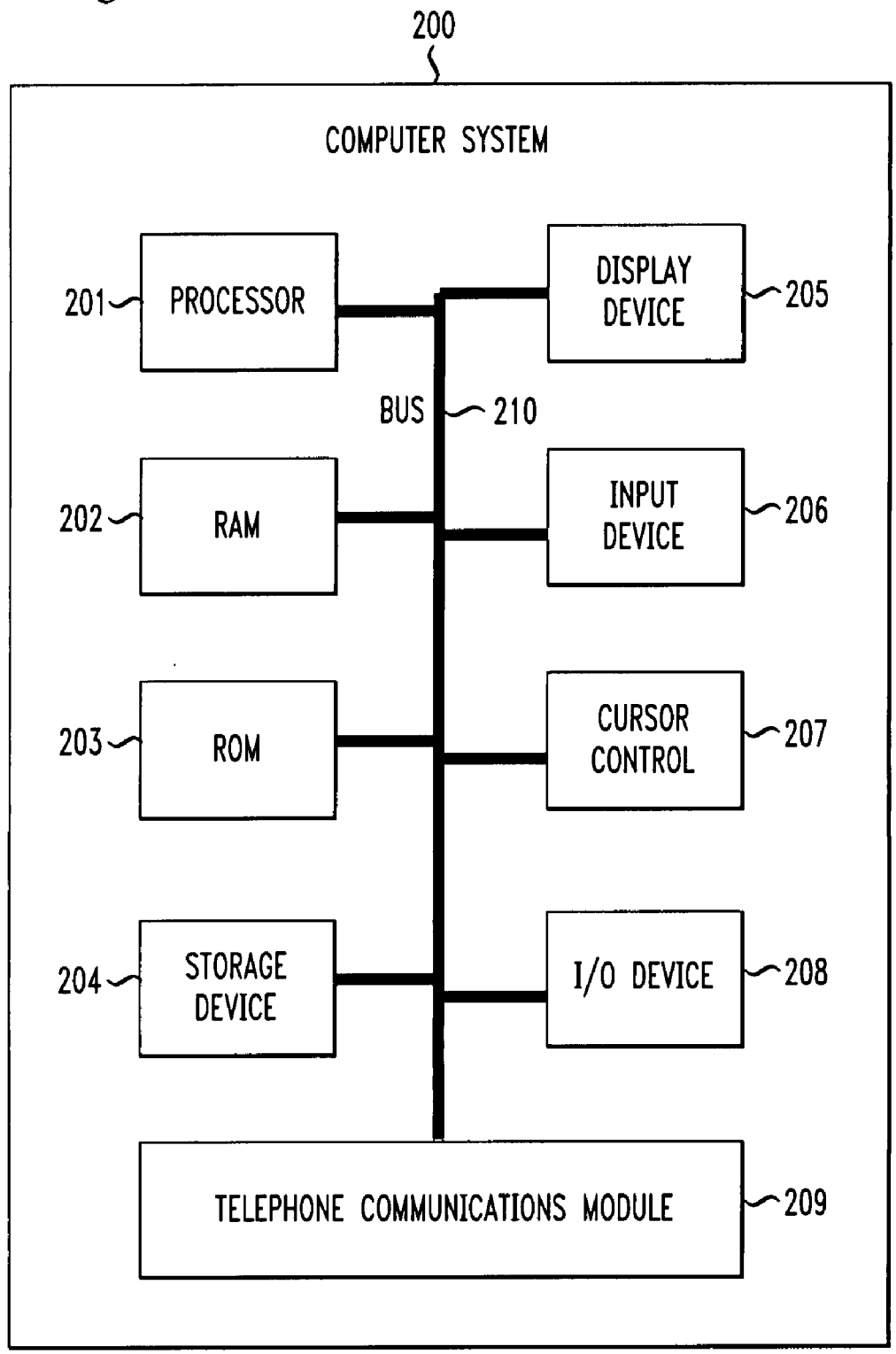
FIG. 2 is a block diagram illustrating an embodiment of a portable computer system in accordance with one aspect of the present invention.
Figure 3:
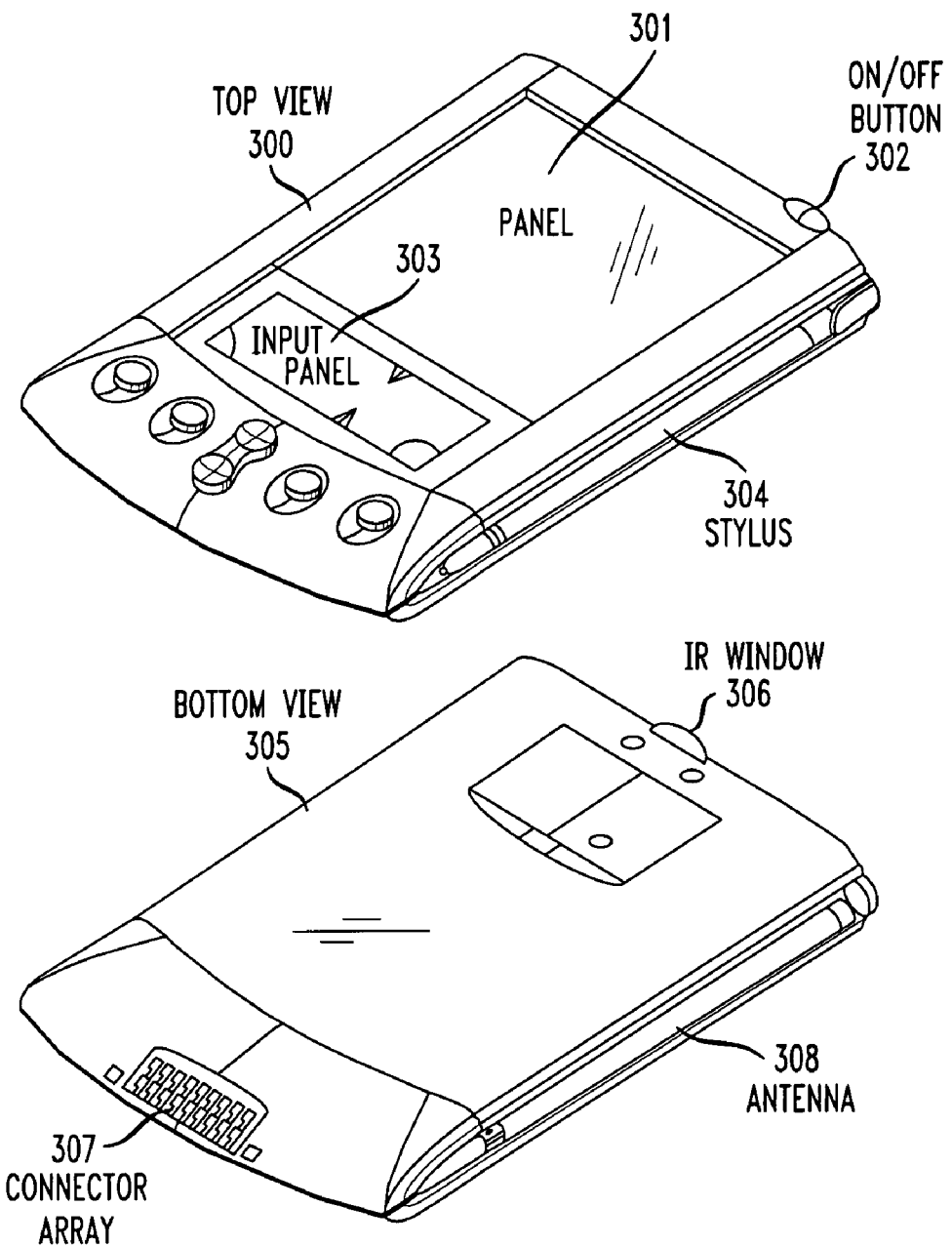
FIG. 3 illustrates a physical embodiment of a portable device in accordance with one embodiment of the present invention.
Figure 5:
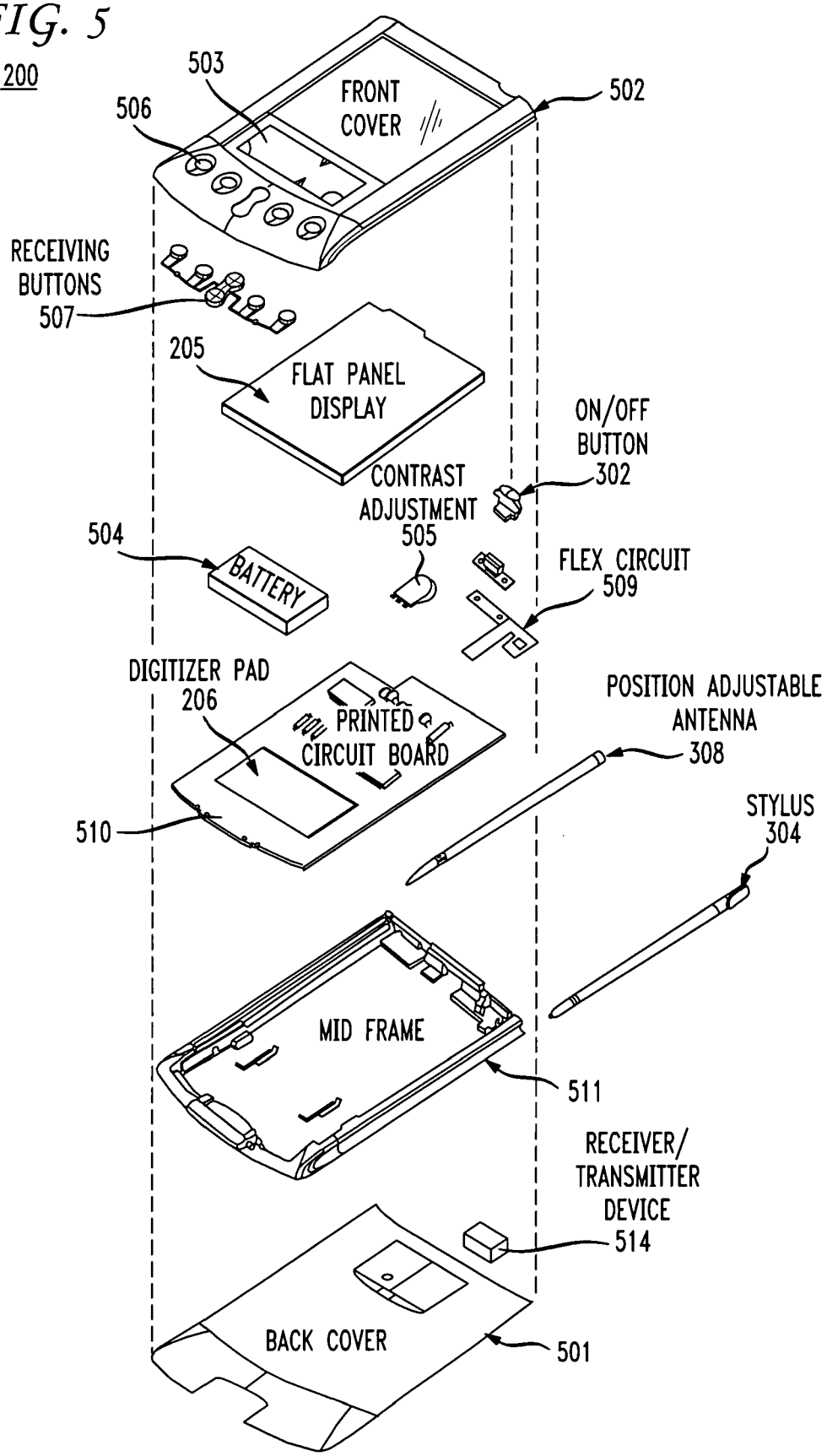
FIG. 5 illustrates an exploded view of a typical portable computing device in accordance with one embodiment of the present invention.

As noted above, embodiments of the present invention may be practiced on a wireless phone, a pager, a PDA, etc. A typical palmtop device is illustrated in FIGS. 2, 3 and 5. FIG. 2 illustrates, in block diagram, a configuration typical to a palmtop device or PDA or intelligent wireless phone. Computer system 200 comprises bus 210 which connects processor 201, volatile RAM 202, non-volatile ROM 203 and data storage device 204. Also connected to the bus are display device 205, alpha-numeric input device 206, cursor control 207, and signal I/O device 208. Signal I/O device 208 is implemented as a serial connection, an infrared transceiver or an RF transceiver and any one of them can, in some embodiments, be used as the link for synchronization. In wireless telephones or in PDA's configured to include the functions of wireless telephones, telephone communications module 209 would also be included. The configuration of the devices to which this embodiment of the present invention applies may vary, depending on the specific tasks undertaken. In every case, however, display device 205 and cursor control 207 would be implemented in one form or other.

FIG. 3, a top and bottom view of a typical palmtop device, illustrates the physical implementation of some of the logical devices above. Panel 301, in top view 300, integrates the display device and, when touched with stylus 304, cursor control. Alphanumeric input is via input panel 303. Power to the device is applied when on/off button 302 is depressed. Connection to a network can be implemented either through an RF connection using extendible antenna 308, or by infrared (IR) connection. IR connection is provided by IR window 306 which is shown on bottom view 305. Connector array 307 provides the capability for wired connectivity to a desktop computer and thence a network by the use of a cradle (See FIG. 4). Although implemented in this embodiment as a serial port, wired connectivity via connector 307 could also alternatively be any of a number of well known communication standards and protocols, e.g., parallel, SCSI (small computer system interface), Firewire (IEEE 1394), Ethernet, etc.

Further illustration of these devices is given in FIG. 5. FIG. 5 is an exploded view of palmtop computer system 200 in accordance with one implementation. Computer system 200 contains a back cover 501 and a front cover 502 having an outline of region 503 and holes 506 for receiving buttons 507. A flat panel display 205 (both liquid crystal display and touch screen) fits into front cover 502. Any of a number of display technologies can be used, e.g., liquid crystal display (LCD), field emission display (FED), plasma, etc., for the flat panel display 205. A battery 504 provides electrical power. A contrast adjustment 505 is also shown, as well as an on/off button 302. A flex circuit 509 is shown along with a printed circuit (PC) board 510 containing electronics and logic (e.g., memory, communication bus, processor, etc.) for implementing computer system functionality. The digitizer pad 206, implementing one means of alpha-numeric input, is also included in PC board 510. A midframe 511 is shown along with stylus 304. Position-adjustable antenna 308 is also shown.

For devices which integrate the functions of a palmtop device and a wireless telephone, communication to the wireless telephone system is primarily provided by RF. To illustrate the implementation of an RF link in an embodiment of the present invention, a signal (e.g., radio) receiver/transmitter device 514 is also shown in FIG. 5. The receiver/transmitter device 514 is coupled to the antenna 308 and also coupled to communicate with the PC board 510.

FIG. 5 illustrates the implementation of several features illustrated in FIG. 2. Some circuitry of computer system 200 can be implemented directly on PC board 510 (FIG. 5). PC board 510 can contain processor 201, bus 210, ROM 203 and RAM 202.

Figure 4:
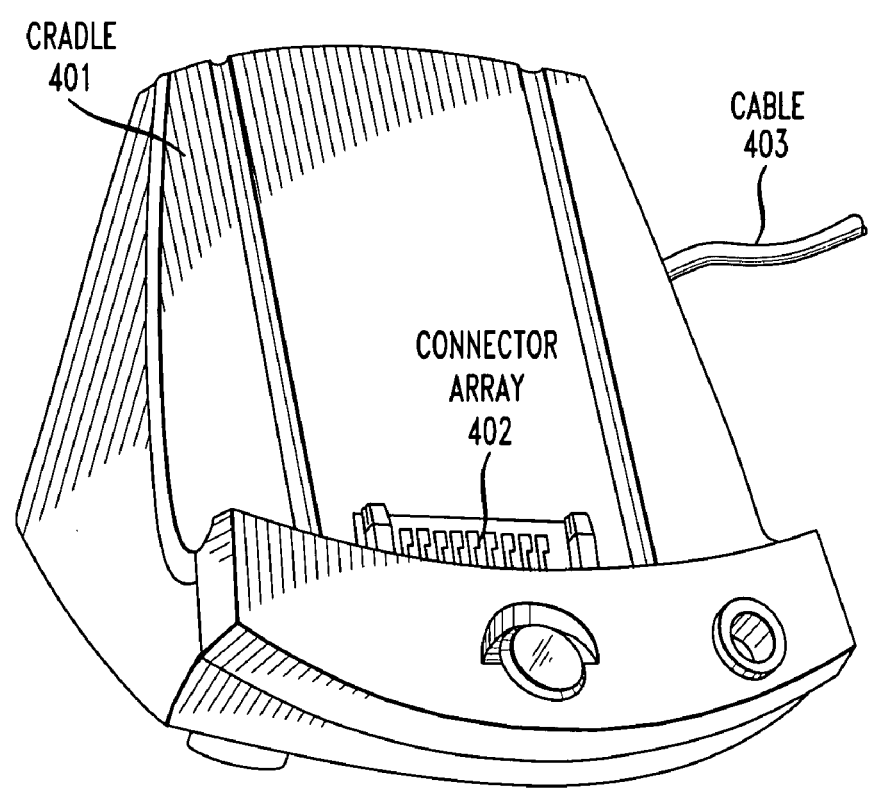
FIG. 4 illustrates a cradle for a connection of a typical portable computing device in accordance with one embodiment of the present invention.

The typical connection between a portable computing device and its associated host device is by a cradle connected to a serial port on the host device. FIG. 4 is an illustration of a typical cradle. To connect, the palmtop device is set in cradle 401 where connector array 402 contacts the counterpart connectors on the portable device. The connectors, through cable 403, enable serial communication with the host device. The host device is represented in this embodiment as desktop 107 in FIG. 1.

Graphical User Interface of the Present Invention

The embodiment of the present invention discussed herein features the use of a graphical information window in a GUI (Graphical User Interface) presented in a graphic display. The term "graphical information", as used in this discussion, may include both icons and text. While the particular portion of the graphic display envisioned as the information window is, in this embodiment, the area at the edge of the graphic display window, other embodiments could use a different area of the display.

In a typical GUI, as implemented in a portable electronic device, a portion of the display can be reserved from use by an application and devoted to other tasks. Usually, those other tasks are related to the function and status of the device on which the display resides. This reserved portion of the display is commonly known, and is referred to in the remainder of this discussion, as the status bar. It must be remembered, however, that even though other embodiments of the present invention may refer to a reserved portion of the display window by some other term, the functionality would be similar.

In this embodiment of the present invention, as implemented in a device enabled with the functionality of a wireless phone, the status bar, though still reserved from the application window, is allowed to perform an additional task. Because the status bar is not in use by an application that may be in operation and occupying the graphic display, the status bar is ideally suited to perform the alternative task of informing the user of an incoming telephone call. Since the status bar is not involved with the display of data and receiving of input from an application, it is able to momentarily present information related to the incoming call without disturbing the application window.

Figure 6A:
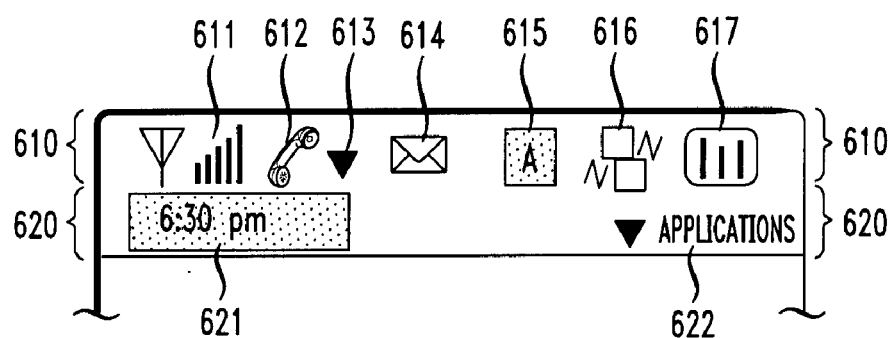
FIG. 6A illustrates one exemplary implementation of a display in accordance with one embodiment of the present invention.
Figure 6B:
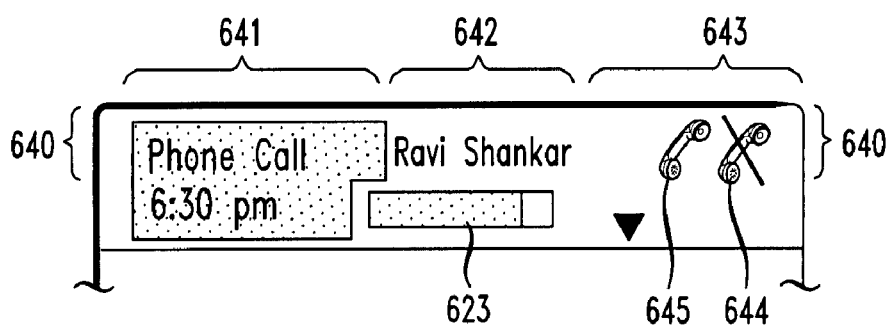
FIG. 6B illustrates one exemplary implementation of a display in accordance with one embodiment of the present invention.

FIGS. 6A and 6B illustrate examples of implementations of a status bar and an alternative incoming-call on-screen display. FIG. 6A shows a status bar presentation that could be found on a typical PDA enabled as a wireless phone. Area 610 is devoted to the status of the device and it functionality in the wireless telephone system. Icon 611 is typical of an iconic graphic used to inform the user of level of service, such as reception, the user may expect from the telephone system. Icon 612 is typical of an iconic graphic used to inform the user of phone on/off status. Icon 613 is typical of the icons used to provide a graphic selection tool for a pull-down menu. In this embodiment, the pull-down is likely a list of selectable telephone numbers. Icon 613, then, is a graphic selection tool and is typical of an icon used to receive input from a user.

In the implementation illustrated here, if the user "clicks" or otherwise selects icon 613, a list of stored phone numbers may become visible in the pull-down window. This use of the icon is only presented here by way of example. Nothing in the status bar shown in FIG. 6A should be construed as limiting any embodiment of the present invention to any particular set of icons or other information.

Other functional examples are the email access of icon 614, the text messaging access of icon 615, internet connectivity of icon 616 and device battery status 617. Again, each of the graphic icons shown in display region 610 are exemplary of those typical to a status bar display. In other embodiments, other functions may be represented by other icons. However, the function of the status bar remains that of showing information and accepting user input unrelated to the remaining portions of the display.

Region 620 of both FIGS. 6A and 6B is shown here as unrelated to the status bar. It is implemented in this embodiment as a clock, 621, and menu pull-down area, 622. It could, in other embodiments be a portion of the display used by the application or it could also be a portion of the status bar.

FIG. 6B illustrates an on-screen display, in accordance with this embodiment of the present invention, that has changed in response to an event. In this case the event is an incoming telephone call. While this embodiment is implemented as a wireless telephone, other embodiments could use the functionality of the changeable status bar to present other information, such as an alarm or appointment reminder, without interfering with the application in progress.

In FIG. 6B, the changed status bar, shown as region 640, contains event indicator 641 showing a call indication, event information area 642 showing caller ID information, and response area 643 which contains icons 644 and 645, which are on-screen graphic selection tools. Shown as examples, as were the previous iconic examples, 644 and 645 provide user response selection. Icon 644 is shown here as a rejection icon and 645 is shown as an answer icon. Selection of either on-screen icon, whether by cursor or by tapping a touch screen with a stylus or even a finger, would result, in this embodiment, in either an answer or a rejection of the call. In other embodiments, other responses and other graphic selection tools could also be implemented. There could, for example, be another option to have the incoming call answered by voice mail, thereby providing yet another on-screen icon.

The important consideration in these examples is that whatever the action taken, the information presented, the options offered to the user, the selection made by the user and the execution of the user's desires would all be accomplished without interruption of an existing-application in current operation. Therefore, a user could use the status bar indicators to either answer a call or not, without interrupting the application that is currently in use.

Figure 7A:
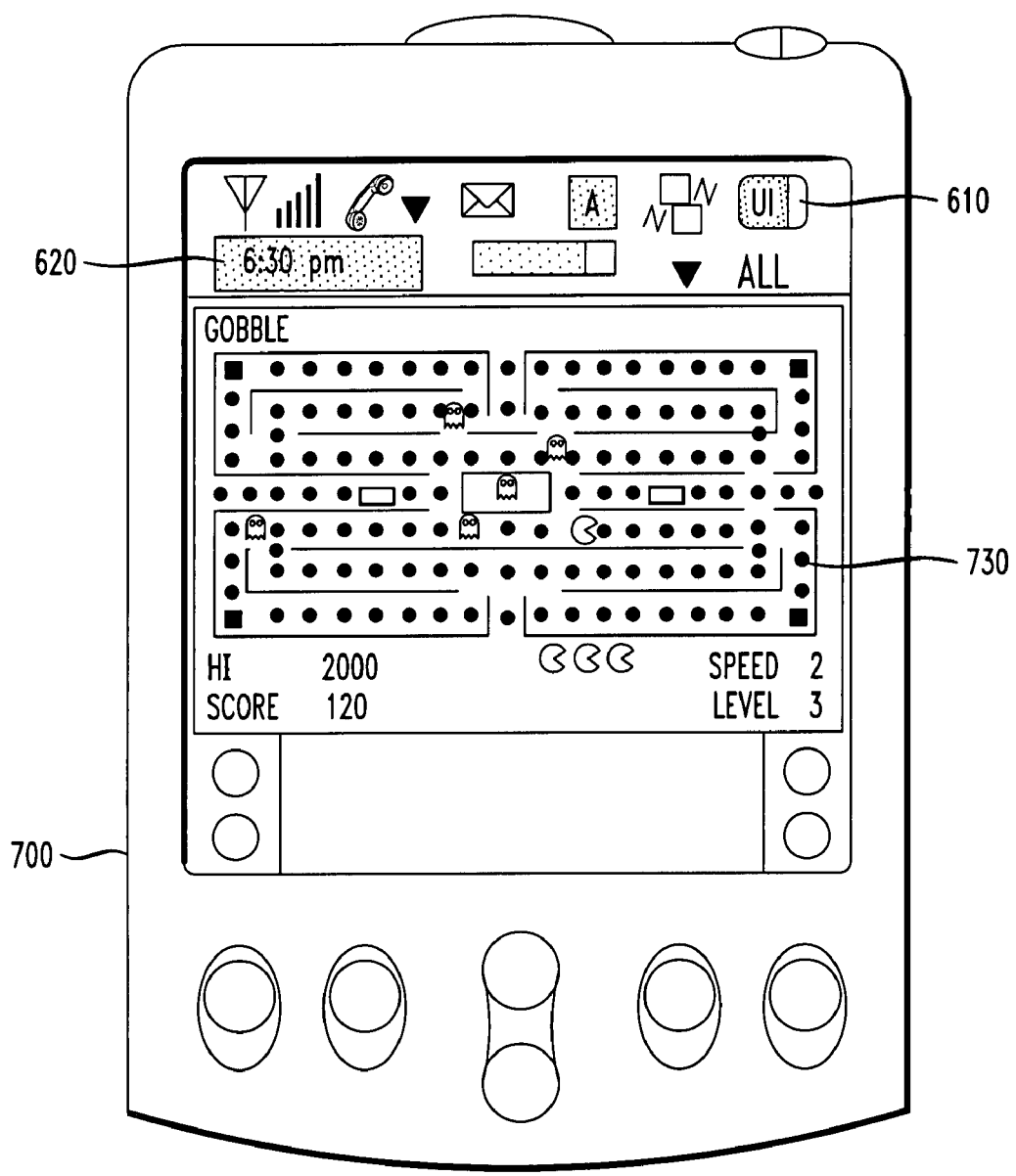
FIG. 7A illustrates one exemplary implementation of a display in a portable electronic device in accordance with one embodiment of the present invention.
Figure 7B:
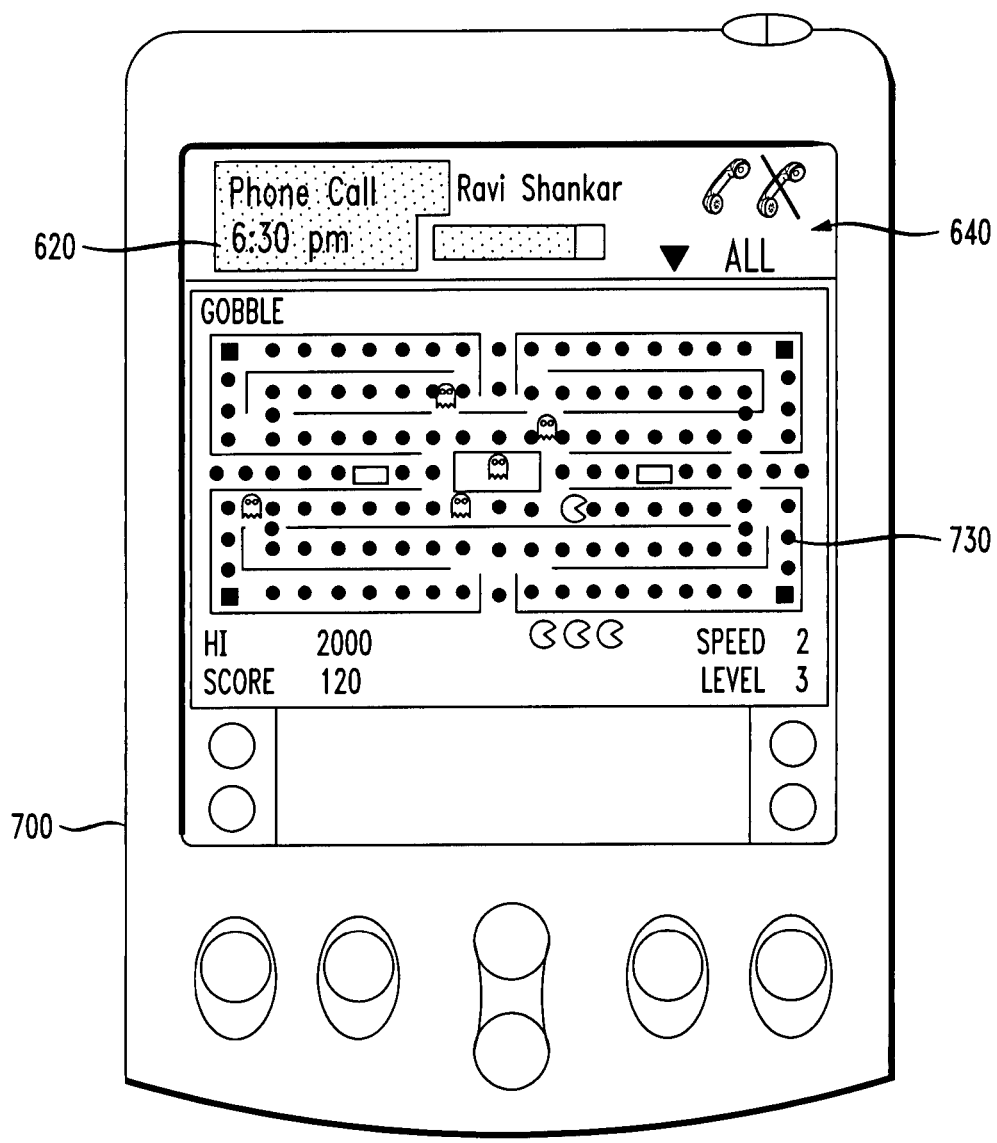
FIG. 7B illustrates one exemplary implementation of a display in a portable electronic device in accordance with one embodiment of the present invention.

FIG. 7A and FIG. 7B illustrate a typical application, in this case a game, as it would appear in use in an exemplary PDA, 700, enabled with wireless telephone functionality. The game application shown in FIGS. 7A and 7B is particularly applicable to this embodiment of the present invention because a game, like many applications, demands the user's full attention. Most games do not suffer interruption without some interference.

The game display in FIG. 7A shows the same status information as was discussed in FIG. 6A. Again, region 610, the status bar in this embodiment, is shown as being at the top of the display. The game shown in display area 730 is only selected for its easy recognition as being a game and not related to controlling the functions of the device. Other implementations, of course, could use any one of thousands of possible applications.

FIG. 7B shows the status bar as having been changed to inform the user, the presumed game player, of an incoming call. The information, as in FIG. 6B, is presented in on-screen region 640. Again, the graphics displayed in the altered status bar relate to the event, the call; information about it, caller ID; and selection options for the call's disposition, the answer and reject icons. And again, the remainder of the display, region 620 and game display 730, remain unaffected.

Figure 8A:
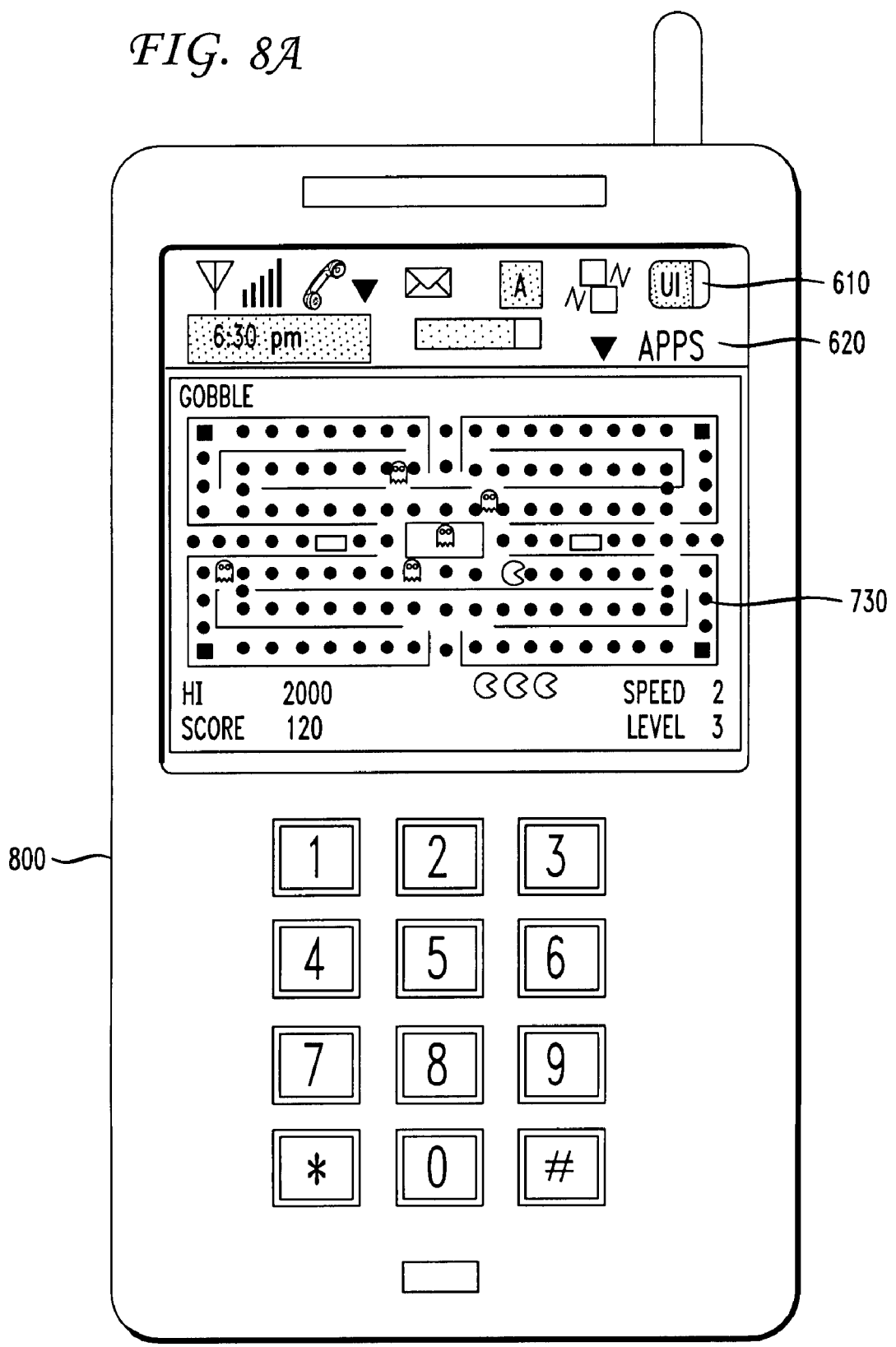
FIG. 8A illustrates one exemplary implementation of a display in a wireless telephone device in accordance with one embodiment of the present invention.
Figure 8B:
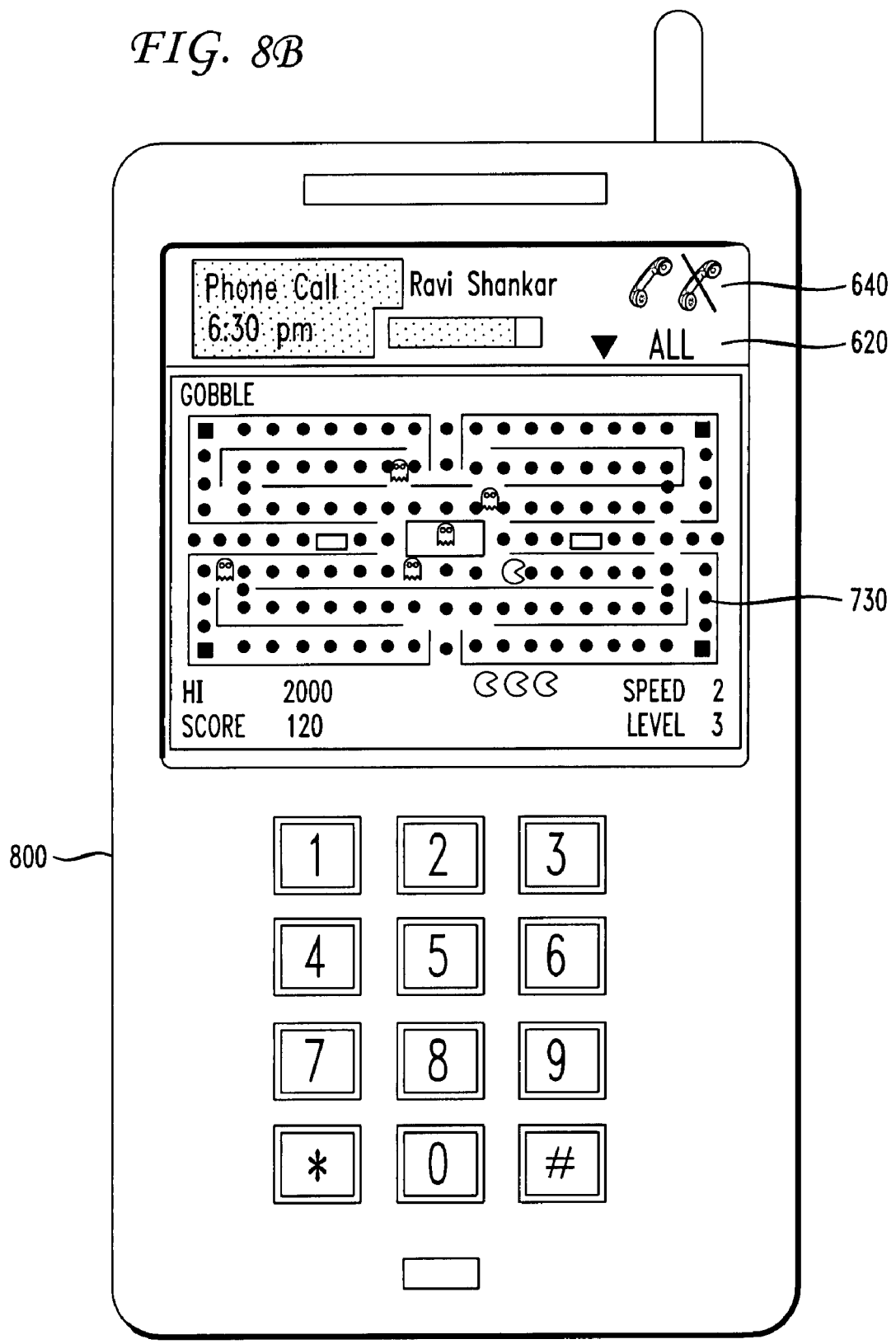
FIG. 8B illustrates one exemplary implementation of a display in a wireless telephone device in accordance with one embodiment of the present invention.

FIGS. 8A and 8B illustrate a typical wireless telephone device in which some of the functions of a palmtop device are implemented. Display 730, as in PDA 700 in FIGS. 7A and 7B, is, again a recognizable game display that is playable in a telephone device that is enabled with those types of functions. In FIG. 8A, the game is being played with no call incoming, and the status bar in region 610 and region 620 display the same examples as were shown in FIG. 6A.

FIG. 8B illustrates the change in the status bar that would happen, in this embodiment, in the event of an incoming call. The display shown here contains the same information as was shown in region 640 in FIG. 6B.

Once again, the user is able to select a response, either an answer or a rejection, or in a further embodiment, directing the call to voicemail, to the incoming call. Again the options shown allow the user to continue the existing application without interruption or to take the call. Again, the option has no effect on the application display.

A possible mode of operation, in keeping with one embodiment of the present invention, is illustrated by the flow chart in FIG. 9. At the start of operation 900, the wireless telephone listens for incoming calls, if it is so programmed, 910. If there is an incoming call, 915, the display changes, 920, even if there is no other application running. The user is given the choice of answering the call or not, 935. If the call is answered, the application is, in the embodiment discussed here, interrupted, then resumed, 960, when the call is completed. If the call is rejected or sent to voice mail, the command is executed but the running application continues uninterruptedly, 960. If there is no incoming call, the user may or may not run an application, 925. If an application is run, the telephone can continue to listen for incoming calls. If no application is run, 950, the telephone can still continue to listen for calls, 955, or the device may be switched off, 980, as the user desires. In any of the cases, the device can listen for incoming calls and offer the user the opportunity of accepting or rejecting the call without interruption of other applications.

In the various embodiments shown above, the existing graphic display is affected by the arrival of an incoming telephone call. In each case, though, the change in the display does not affect the existing presentation from the application in use at the receipt of the telephone call. In this way, in these embodiments, the status bar is used for the alternative purpose of presenting the call information and presenting options for call disposition while leaving the remainder of the display uninterrupted.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for implementing a graphic user interface for an electronic device, comprising the steps of:
   a) rendering an image of a graphical user interface on a display screen, said graphical user interface comprising a first display for displaying an application and a second display for displaying a status bar, wherein said first display region and said second display region are displayed concurrently;

b) receiving input comprising information relating to an event, wherein said event is unrelated to said application in operation in said first display of said graphical user interface;

c) displaying an indication of said information in said status bar of said graphic user interface and also in response to said event displaying a graphical interface tool in said status bar that provides to a user a selection with respect to said event; and, d) taking an action with respect to said event, wherein said action is responsive to said selection from said user, said selection comprising a command related to the disposition of said event;

wherein steps a)-d) are performed while said application is operating and without interfering with said other application.

2. A method as described in claim 1 wherein said portable electronic device is enabled as a portable telephone device.

3. A method as described in claim 1 wherein said event is an incoming telephone call.

4. A method as described in claim 1 wherein said information related to said event is caller identification information.

5. A method as described in claim 1 wherein said input from said user, comprising a command, is an instruction to answer an incoming telephone call.

6. A method as described in claim 1 wherein said input from said user, comprising a command, is an instruction to reject an incoming telephone call.

7. A method as described in claim 1 wherein said input from said user, comprising a command, is entered by selection of a graphic selection tool in said graphic user interface.

8. A method as described in claim 1 wherein said action responsive to said event is capable of execution without disturbing said application, wherein said application is displaying information on said portable computer system.

9. A method as described in claim 1 wherein said graphic user interface is implemented in a touch-screen display.

10. A method for implementing a graphic user interface for a portable telephone device, comprising the steps of:

a) rendering an image of a graphical user interface on a display screen, said graphical user interface comprising a first display region for displaying an application in operation and a second display region for displaying a status bar, wherein said first display region and said second display region are displayed concurrently;

b) receiving input comprising information relating to an incoming telephone call;

c) displaying an indication of said information in said status bar of said graphic user interface and also in response to said incoming telephone call displaying a graphical interface tool in said status bar that provides to a user a selection with respect to said call;

d) responsive to a selection from said user, said selection comprising a command related to the disposition of said incoming telephone call, taking an action with respect to said telephone call; and, wherein steps a)-d) are performed while said application is operating and without interfering with said other application.

11. A method as described in claim 10 wherein said information related to said incoming telephone call is caller identification information.

12. A method as described in claim 10 wherein said input from said user, comprising a command, is an instruction to answer said incoming telephone call.

13. A method as described in claim 10 wherein said input from said user, comprising a command, is an instruction to reject said incoming telephone call.

14. A method as described in claim 10 wherein said input from said user, comprising a command, is entered by selection of a graphic selection tool in said graphic user interface.

15. A method as described in claim 10 wherein said action responsive to said incoming telephone call is capable of execution without disturbing said application, wherein said application is displaying information on said portable computer system.

16. A method as described in claim 10 wherein said graphic user interface is implemented in a touch-screen display.

* * * * *

UNITED STATES PATENT AND TRADEMARK OFFICE
CERTIFICATE OF CORRECTION

| | | |
|---|---|---|
| PATENT NO. | : 7,289,772 B1 | Page 1 of 1 |
| APPLICATION NO. | : 10/984114 | |
| DATED | : October 30, 2007 | |
| INVENTOR(S) | : Bonansea et al. | |

It is certified that error appears in the above-identified patent and that said Letters Patent is hereby corrected as shown below:

On the Title Page, please add the following paragraph:

Item -- (63)    Related U.S. Application Data

Continuation of application 09/764,653, filed on Jan. 16, 2001, now Pat. No. 6,868,283. --

Signed and Sealed this
Twentieth Day of March, 2012

David J. Kappos
*Director of the United States Patent and Trademark Office*